Dec. 13, 1966  R. K. ZAHN  3,290,789
METHOD AND DEVICE FOR COLLECTING AND SEPARATING
FRACTIONS OF LIQUID MATERIALS
Filed June 23, 1965

INVENTOR.
RUDOLF K. ZAHN.

United States Patent Office 3,290,789
Patented Dec. 13, 1966

3,290,789
METHOD AND DEVICE FOR COLLECTING AND SEPARATING FRACTIONS OF LIQUID MATERIALS
Rudolf K. Zahn, Goldbergweg 2, Frankfurt am Main, 6 Germany
Filed June 23, 1965, Ser. No. 466,253
Claims priority, application Germany, June 25, 1964, M 61,512
9 Claims. (Cl. 34—5)

The present invention relates to a method and a device for collecting and separating, including preserving fractions of any desired material, which conventionally emerges as liquid from chromatographic columns.

For a fractionated suspension of liquids coming in continuous flow and drop by drop sequence from a chromatographic column, there are fractionation collectors known and used in the art. These are large rotating punctured plates for receiving a large number of small tubes. Those starting at the periphery are arranged spirally towards the center of the plate. The changing of fractionation, i.e., the intermittent stepwise rotation of the place is controlled by impulses depending upon the number of the drops or their volume.

These fractionation collectors have the big disadvantage that they require too much space and are relatively expensive. Furthermore, the evaluation of the fractionation and subsequent treatment of the individual fractions (for instance elutriation of chromatographic columns) is very time consuming and difficult. Finally devices of this type cannot be used for the collecting of fractions of biological material which is thermo-labile. The placement of the whole apparatus into a freezer or construction of cooled fractionation collectors brings substantial difficulties for the persons handling the same and very often disturbs the mechanical functioning of the device, and is without any merits for cases where the eluate must be rapidly frozen.

In accordance with the present inventive method, the fractions of liquid material emerging, preferably drop by drop, are subjected to a temperature below the freezing point of the liquid, preferably at a temperature which is equal to that of Dry Ice (solid $CO_2$) or is even below such a temperature. In this manner the fractions can be collected in columns of solid aggregate condition and of any desired cross section. For this purpose there are used solutions which can be frozen by suitable means, such as Dry Ice, liquid air, or the like.

The liquid emerging from the separating device drops into a collecting tube and freezes. By correspondingly suitable conditions of the thermal passage through the wall of the collecting tube and heat supply to the dropping liquid, the dropped-in solution will collect at the bottom of the container, distribute itself, and will freeze. If the heat supply is very strong, the drops of liquid, by contact with the collecting bottom, will freeze immediately and its distribution will become insufficient. Thereby is formed a freely standing stalagmite, but there can also occur a case that the following material under certain conditions will flow over the freezing material at the bottom of the stalagmite. In a particular way of carrying out the method this can be prevented, and particularly satisfactory results can be obtained by having a special size drop of approximately 1/20 cubic centimeter, and by the utilization of Dry Ice (at a temperature of approximately $-78°$ C.) the height of dropping distance of the drops can be selected to be equal or smaller than 80 centimeters.

In a suitable further method the following liquid is continuously collected in an intermediate step and is there collected in exactly predetermined portions columnwise. In this case the cooling temperature in the range of collector and the timely distancing of portionwise delivery is selected such that the just previously delivered liquid portion will reach the aggregate conditions in said range prior to the next portion reaching same. Hereby there is dispersed, in case of correct dimensioning, the volume of the intermediate stage in such a manner that it will appear as a sea over the bottom of the collector container. Because of its relatively large heat content, which evolves from the intermediate stage in the form of a large wave, a certain amount of time will pass until this portion will freeze. The freezing time must be dimensioned, as mentioned above, such that it will be shorter than the time which will pass until the next portion will follow.

In case of solutions which are more difficult to freeze, the heat passage through the wall of the collector tube must be made greater or the cross section of same reduced. With correct dimensioning, the solution emerging from the separating device will freeze to a column made of evenly frozen fine thin layers whereby each layer corresponds to the amount of wavewise delivered liquid of the intermediate stage. Each individual fraction will thereby consist of a number of such layers or laminations, in such a manner that the fractionating change will lie always between two laminae. The laminated column can be stored in the described form, which conventionally occurs in a cooling freezer.

The fractionation collection is conventionally used for proof of fractions and in the simplest case by natural or artificial coloring or colored proteins the fractions in the laminated column can be recognized by its coloring. For isolating same there can be used, for instance, a surgical saw which will cut out the portions desired between the laminated column.

In most cases the fractions are not colored. Very often they absorb the ultraviolet light, such as aromatics, nucleonic acid derivatives, and with the exception of protamines, all proteins, and a number of amino acids, vitamins and similar substances. In order to prove the presence of such fractionations, the laminated column in its solid aggregate condition is placed onto a light sensitive paper and exposed to the ultraviolet light. On the developed paper are the places which have absorbed the ultraviolet light, can be clearly recognized, and the same can be removed in a simple manner by sawing them out of the column.

Finally, it is possible to make visible fractionations directly from the substance, in particular when it is operated with volatile buffering means. Hereby the fraction containing columns in solid aggregate state can be dehydrated and the volatile substances can be removed by freeze drying or vacuum volatilization under freezing temperatures. By carrying out this process first all the water is sublimated and then the following buffering means, so that there will remain only fractions in solid state. This process is particularly suitable by separation of amino acids, peptides, some proteins, and nucleonic acid derivatives. Obviously the fractions separated from the column can be treated separately after the freeze drying process.

EXAMPLE 30 mg. DNA (desoxyribonucleic acid) are melted with 1.5 ml. 98% formic acid in a glass ampoule of 5 ccm. and are heated in a metal capsule of 175° C. for 45 minutes. Said DNA is afterwards cooled in Dry Ice ($CO_2$) at $-80°$ C., and the ampoule is opened. The formic acid is then evacuated (surged) at high vacuum (0.01 torr), the hydrolate is dissolved with 5 ml. of a buffer consisting of $NH_4Cl$ (0.025 M) and $NH_4OH$ (0.2 M), pH 10.6, and applied to a column of ion exchangers DOWEX 1 equilibrated with this buffer. This column has a diameter of 8 cm. and a height of 8.4 cm.

700 ml. of this buffer are passed through the column at a rate of 50 ml./h. The discharge is led into a glass syphon having a capacity of 3 ml. and collected in the freezing collector according to the present invention, said collector having a cross section of 30 x 60 cm. Two collector columns are filled.

The buffer is changed hereafter to $NH_4Cl$ (0.2 M) and $NH_4OH$ (0.4 M), pH 10, and subsequently another 200 ml. of this buffer are passed through this column.

At the first buffer, the bases appear in the following sequence: cytosine, thymine, guanine; at the second buffer: the base is adenine.

The frozen column is placed on a light-sensitive strip and exposed for 7 seconds to mineral light at a distance of about 20 cm. and then the strip is developed. The various fractions are separated from each other by a stain-less saw, the volume of said fractions is measured and the ultraviolet extinction is measured at 260 n-m. The amount of the substances results therefrom.

By the present invention also is developed a suitable device for carrying out the method and process in accordance with the present invention.

In accordance with the present invention a closed or closable, or an open tube made of noncorrosive metal or plastic is preferably used. This tube is surrounded by a cooling means and is in a thermostatic container kept for columnwise collection of fractionations which are placed in the upper opening.

In a particular modification of the invention there is provided for dropping-in fractionations a liquid dosing device, and in particular, in the form of a container which is open at the top and is provided at the bottom with a siphon-shaped closure.

Finally there is provided a device with which it is made possible to obtain solid substances of the fractions in the collector columns. For this purpose there is used a horizontal tube receiving the column, which can be closed on one side which is in connection with a vacuum pump at its upper end.

In the accompanying drawing are shown some examples of devices of the present invention in schematic representation. In the drawings.

Figure 1:
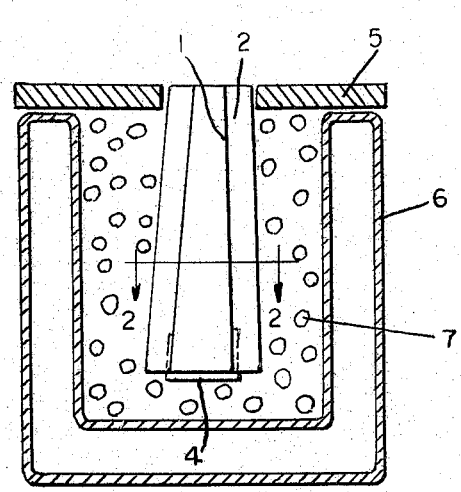
FIG. 1 shows a longitudinal section through a column-shaped collector of the fractions in the form of a tube.
Figure 2:
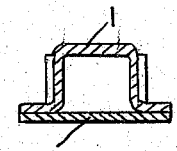
FIG. 2 shows a cross section of the tube along line 2—2 of FIG. 1.
Figure 3:
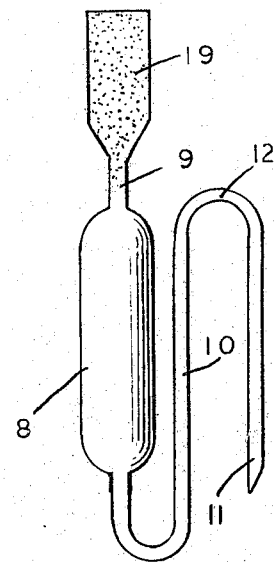
FIG. 3 shows a dosing device which is inserted between the separating column and the fractionation collector, for instance, as shown in FIG. 1.

The collecting tube shown in FIG. 1 consists of a slightly conical U-shaped profile 1 with the two flanges 2 and a closing plate 3 which is connected with the flanges by screwing. At the bottom side the tube is closed by a bottom 4. The upper end of the tube projects into an opening in a lid made of plastic material 5 of a thermos container 6 which is filled with a cooling means 7 which surrounds the tube.

The dosing device consists of a tube-shaped container 8 with an upper opening 9 for receiving the liquid from a separating container 19. On the bottom end is placed a S-shaped siphon closure 10, the dropping place of which is formed by an inclined polished trumpet-shaped widening opening 11. This opening cooperates with the upper opening of the collecting tube as shown in FIG. 1. It is suitable to provide the closure at least at place 12 with light construction, and to coat the inner wall thereof with a hydrophobic layer which can be obtained by siliconizing, so as to prevent the liquid in the upper position of the capillary from distributing itself in a very thin layer which does not fully fill the same on to the lower capillary wall and then subsequently will flow only along the wall into the leg, and finally at the bottom portion of the capillary tube drop after drop will flow in drop-by-drop manner without emptying the whole siphon.

Figure 4:
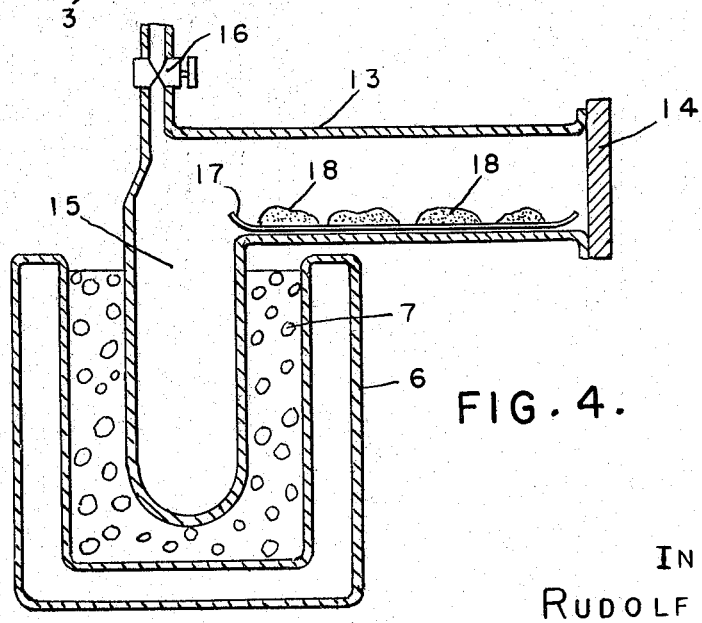
FIG. 4 shows a cross section through a device for the production of the substances to be separated in solid form.

In case of the frozen column obtained by the device shown in FIG. 1, this is brought into a further device according to FIG. 4, by means of freeze drying and can be separated into individual fraction substances. This device consists of a horizontal tube 13 which is closable at one end with a lid 14 in sealing relation, while on the other end is provided a vertical tube used as cooling trap 15, which is surrounded by a cooling means 7 in a thermos container 6. At the upper end this tube 15 is provided with a valve 16 for a vacuum pump, not shown in the drawing. In the tube 13 are indicated substances 18 obtained from the column on a paraffin foil.

I claim:

1. A method for collecting fractions emerging in the form of liquid drops from a chromatographic column which comprises subjecting the liquid drops to a temperature below their freezing point so as to obtain columns of solid aggregates.

2. The method according to claim 1 wherein the temperature is below approximately −78° C.

3. The method according to claim 1 wherein the drop size of the emerging drops is made at approximately 1/20 cubic centimeter, and the dropping distance for the drops is not more than 80 centimeters.

4. The method according to claim 1 wherein the emerging liquid is constantly collected in an intermediate stage and is fed from this stage in dose portions columnwise collected, whereby the cooling temperature in the collection range and the sideward distancing of the portions is so selected that the previously dispensed portions of liquid will reach the solid aggregate condition prior to the next portion reaching the previous one.

5. The method according to claim 1 wherein to the individual fractions are added coloring means in the liquid condition.

6. A method according to claim 1 wherein the column containing the fraction in solid aggregate condition is freed of water and volatile substances by means of freeze drying.

7. A method according to claim 1 wherein the column containing fractions in a solid state, and particularly of right-angled or square cross section, is placed on one side onto a light sensitive paper and is exposed on the opposite side to ultraviolet radiation.

8. An apparatus for collecting fractions of liquid comprising a tube closed below and open at the opposite end, a thermos container surrounding and spaced from the tube whereby cooling means can be placed in the space, and a container with a siphoning closure above said tube arranged to discharge a liquid dose into said tube.

9. In an apparatus for separating and collecting fractions from a chromatographic column, a chromatographic column, means for bringing about the dropwise emergence of fractions from the said chromatographic column, a tube surrounded by a thermos container adapted to receive said fractions, and means for cooling said tube and freezing said drops after they emerge from the column whereby a column of solid frozen fractions is obtained in the container.

References Cited by the Examiner

UNITED STATES PATENTS

| | | | |
|---|---|---|---|
| 2,163,996 | 6/1939 | Flosdorf | 34—5 |
| 2,370,703 | 3/1945 | Zaikowsky | 62—55.5 |
| 2,751,687 | 6/1956 | Colton | 34—5 |

WILLIAM J. WYE, *Primary Examiner.*